US012726449B1

(12) United States Patent
van Adelsberg et al.

(10) Patent No.: US 12,726,449 B1
(45) Date of Patent: Sep. 1, 2026

(54) ALLOCATING NETWORK TRAFFIC TO VARIANT

(71) Applicant: Capital One Services, LLC, McLean, VA (US)

(72) Inventors: Matthew Isaac van Adelsberg, Falls Church, VA (US); Zhun Wang, Vienna, VA (US); Priscilla Alexander, Washington, DC (US); Mackenzie Sweeney, Gainesville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 19/232,798

(22) Filed: Jun. 9, 2025

Related U.S. Application Data

(63) Continuation of application No. 17/444,787, filed on Aug. 10, 2021, now Pat. No. 12,326,803.

(60) Provisional application No. 63/063,604, filed on Aug. 10, 2020.

(51) Int. Cl.
*H04L 47/70* (2022.01)
*H04L 47/24* (2022.01)

(52) U.S. Cl.
CPC ............ *H04L 47/821* (2013.01); *H04L 47/24* (2013.01)

(58) Field of Classification Search
CPC .............................. H04L 47/821; H04L 47/24
See application file for complete search history.

(56) References Cited

U.S. PATENT DOCUMENTS

| | | | | |
|---|---|---|---|---|
| 11,107,133 | B2 * | 8/2021 | Kulkarni | G06F 9/547 |
| 2015/0242751 | A1 * | 8/2015 | Zhang | G06F 17/16 706/46 |
| 2016/0253290 | A1 * | 9/2016 | Xu | G06Q 50/01 715/744 |
| 2017/0168924 | A1 * | 6/2017 | Dereszynski | H04L 43/50 |
| 2018/0253408 | A1 * | 9/2018 | Severn | G06F 3/00 |
| 2019/0244110 | A1 * | 8/2019 | Qiu | G06N 3/126 |
| 2019/0244131 | A1 * | 8/2019 | Levi | G06N 20/00 |
| 2021/0083961 | A1 * | 3/2021 | Polishchuk | H04L 43/50 |
| 2022/0256361 | A1 * | 8/2022 | Soma | H04L 69/22 |
| 2025/0094690 | A1 * | 3/2025 | DeCharms | G06N 20/00 |

* cited by examiner

*Primary Examiner* — Farzana B Huq
(74) *Attorney, Agent, or Firm* — Foley & Lardner LLP

(57) ABSTRACT

A system receive data from a web server and via one or more application programming interface (API) endpoints. The data includes one or more indications of one interacting with one or more variants. The system allocates network traffic to the variant based on the variant overperforming in relation to one or more other variants.

20 Claims, 5 Drawing Sheets

200

500

ALLOCATING NETWORK TRAFFIC TO VARIANT

SUMMARY

Embodiments disclosed herein generally relate to a system and method for allocating network traffic to variant. In one embodiment, a system includes a processor and a memory. The memory has programming instructions stored thereon, which, when executed by the processor, performs one or more operations. The one or more operations include initiating a testing service for one or more variants of a webpage associated with a client computing system. The one or more operations further include receiving, via one or more application programming interface (API) endpoints, user data. The user data includes one or more indications of one or more users interacting with the one or more variants of the webpage. The one or more operations further include inputting the one or more indications into a machine learning model. The machine learning model includes a Bayesian multi-arm bandit algorithm. The one or more operations further include generating, using the machine learning model, one or more results comprising causal performance estimates and a set of decision rules to adaptively design further testing experiments based on the causal performance estimates. The one or more operations further include generating a portal accessible to one or more end users. The portal includes the one or more results.

In some embodiments, the Bayesian multi-arm bandit algorithm includes a value model and a time-dependent policy. The value model is configured to estimate reward distributions based on a Bayesian regression model and one or more deterministic rules. The time-dependent policy includes a mixture of one or more bandit algorithms and one or more deterministic rules for mapping the reward distributions to a real-time allocation of visitors to the one or more variants.

In some embodiments, the Bayesian multi-arm bandit algorithm further includes an attribution model. The attribution model is based on Bayesian multi-touch attribution model that feeds into the value model.

In some embodiments, the Bayesian multi-touch attribution model includes a first sub-model and a second sub-model. The first sub-model is configured to account for an effect of marketing on various external channels. The second sub-model configured to determine a contribution of the webpage to an overall website comprising the webpage.

In some embodiments, generating, using the machine learning model, the one or more results comprising the causal performance estimates and the set of decision rules to adaptively design further testing experiments based on the causal performance estimates includes generating a recommendation of metrics based on the risks and benefits.

In some embodiments, generating, using the machine learning model, the one or more results comprising the causal performance estimates and the set of decision rules to adaptively design further testing experiments based on the causal performance estimates includes analyzing the one or more indications to generate a new experience recommendation.

In some embodiments, generating, using the machine learning model, the one or more results comprising the causal performance estimates and the set of decision rules to adaptively design further testing experiments based on the causal performance estimates includes recommending additional population segments to re-test the webpage based on a meta-analysis of which population characteristics differentiate groups that respond differently to the same experience characteristics.

In some embodiments, generating, using the machine learning model, the one or more results comprising the causal performance estimates and the set of decision rules to adaptively design further testing experiments based on the causal performance estimates includes using results learned from experimentation on another webpage of a website comprising the webpage to inform allocation behavior on the webpage.

In some embodiments, the one or more operations further include identifying missing site content on the webpage and recommending a new module within the webpage based on the missing site content.

In some embodiments, wherein generating, using the machine learning model, the one or more results comprising the causal performance estimates and the set of decision rules to adaptively design further testing experiments based on the causal performance estimates includes identifying a first variant of the one or more variants of the webpage that is underperforming relative to one or more other variants of the one or more variants and recommending to the client computing system to cease operation of first variant.

In some embodiments, recommending to the client computing system to cease operation of first variant includes recommending to the client computing system to direct user traffic to one or more API endpoints associated with the one or more other variants.

In another embodiment, a method of digitally testing one or more variants of a webpage is disclosed herein. A computing system initiates a testing service for one or more variants of a webpage associated with a client computing system. The computing system receives, by the computing system, via one or more application programming interface (API) endpoints, user data. The user data includes one or more indications of one or more users interacting with the one or more variants of the webpage. The computing system dynamically fits a machine learning model to the user data. The computing system generates, using the machine learning model, one or more results comprising causal performance estimates and a set of decision rules to adaptively design further testing experiments based on the causal performance estimates. The computing system generates generating a portal accessible to the client computing system. The portal includes the one or more results.

In some embodiments, generating, using the machine learning model, the one or more results comprising the causal performance estimates and the set of decision rules to adaptively design further testing experiments based on the causal performance estimates includes estimating, via value model of the machine learning model, reward distributions based on a Bayesian regression model and one or more deterministic rules and mapping, via a time-dependent policy comprising a mixture of one or more bandit algorithms and one or more deterministic rules, the reward distributions to a real-time allocation of visitors to the one or more variants.

In some embodiments, the computing system feeds output from an attribution model based on Bayesian multi-touch attribution model into the value model.

In some embodiments, the Bayesian multi-touch attribution model includes a first sub-model and a second sub-model. The first sub-model is configured to account for an effect of marketing on various external channels. The second sub-model is configured to determine a contribution of the webpage to an overall website comprising the webpage.

In some embodiments, generating, using the machine learning model, the one or more results comprising the causal performance estimates and the set of decision rules to adaptively design further testing experiments based on the causal performance estimates includes generating a recommendation of metrics based on the risks and benefits.

In some embodiments, generating, using the machine learning model, the one or more results comprising the causal performance estimates and the set of decision rules to adaptively design further testing experiments based on the causal performance estimates includes analyzing the one or more indications to generate a new experience recommendation.

In some embodiments, generating, using the machine learning model, the one or more results comprising the causal performance estimates and the set of decision rules to adaptively design further testing experiments based on the causal performance estimates includes recommending additional population segments to re-test the webpage based on a meta-analysis of which population characteristics differentiate groups that respond differently to the same experience characteristics.

In some embodiments, generating, using the machine learning model, the one or more results comprising the causal performance estimates and the set of decision rules to adaptively design further testing experiments based on the causal performance estimates includes using results learned from experimentation on another webpage of a website comprising the webpage to inform allocation behavior on the webpage and identifying missing site content on the webpage and recommending a new module within the webpage based on the missing site content.

In another embodiment, a non-transitory computer readable storage medium is disclosed herein. The non-transitory computer readable storage medium has instructions stored thereon, which, when executed by a processor, performs one or more operations. The one or more operations include initiating a testing service for one or more variants of a webpage associated with a client computing system. The one or more operations further include identifying one or more application programming interface (API) endpoints located on each variant of the webpage. The one or more operations further include receiving, via the one or more API endpoints, user data. The user data includes one or more indications of one or more users interacting with the one or more variants of the webpage. The one or more operations further include dynamically fitting, by the computing system, a machine learning model to the user data. The one or more operations further include generating, using the machine learning model, one or more results comprising causal performance estimates and a set of decision rules to adaptively design further testing experiments based on the causal performance estimates. The one or more operations further include transmitting the one or more results to the client computing system.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventional digital testing services suffer from a number of deficiencies. For example, conventional digital testing services currently do not have a standard procedure for test data processes or execution, there is currently little to no statistical support for their test analysis, and they are simply unable to support tests that break classical statistical methods. As a result, digital testing services leave a lot to be desired in terms of the results they produce and their usability.

The one or more techniques disclosed herein improve upon conventional digital testing services by generating causal performance estimates and a set of decision rules to adaptively design experiments based on those causal estimates. For example, the system disclosed herein employs Bayesian multi-arm bandit techniques to generate a full trained model for testing various web services. By employing a Bayesian approach, the system is available to dynamically test webpages with several variables.

Further, the Bayesian approach helps the system avoid common experimental pitfalls in conventional systems, such as peeking and multiple comparisons without loss of power (e.g., a likelihood of finding real improvements). In this manner, the present system may allow end users to pause or stop testing prior to a scheduled end date and/or alert users when an issue is identified. As a result, users are able to more quickly view web services/web page statistics at any point during the testing process.

An exemplary process would involve the digital testing of a website associated with a business. The business may wish to test multiple variants (e.g., beta pages) of a certain webpage of the website. Instead of replacing the current (e.g., default) webpage with one of the beta pages, the business may test each beta page (and the default page) to determine which beta page results in more user interaction (e.g., conversion rates).

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
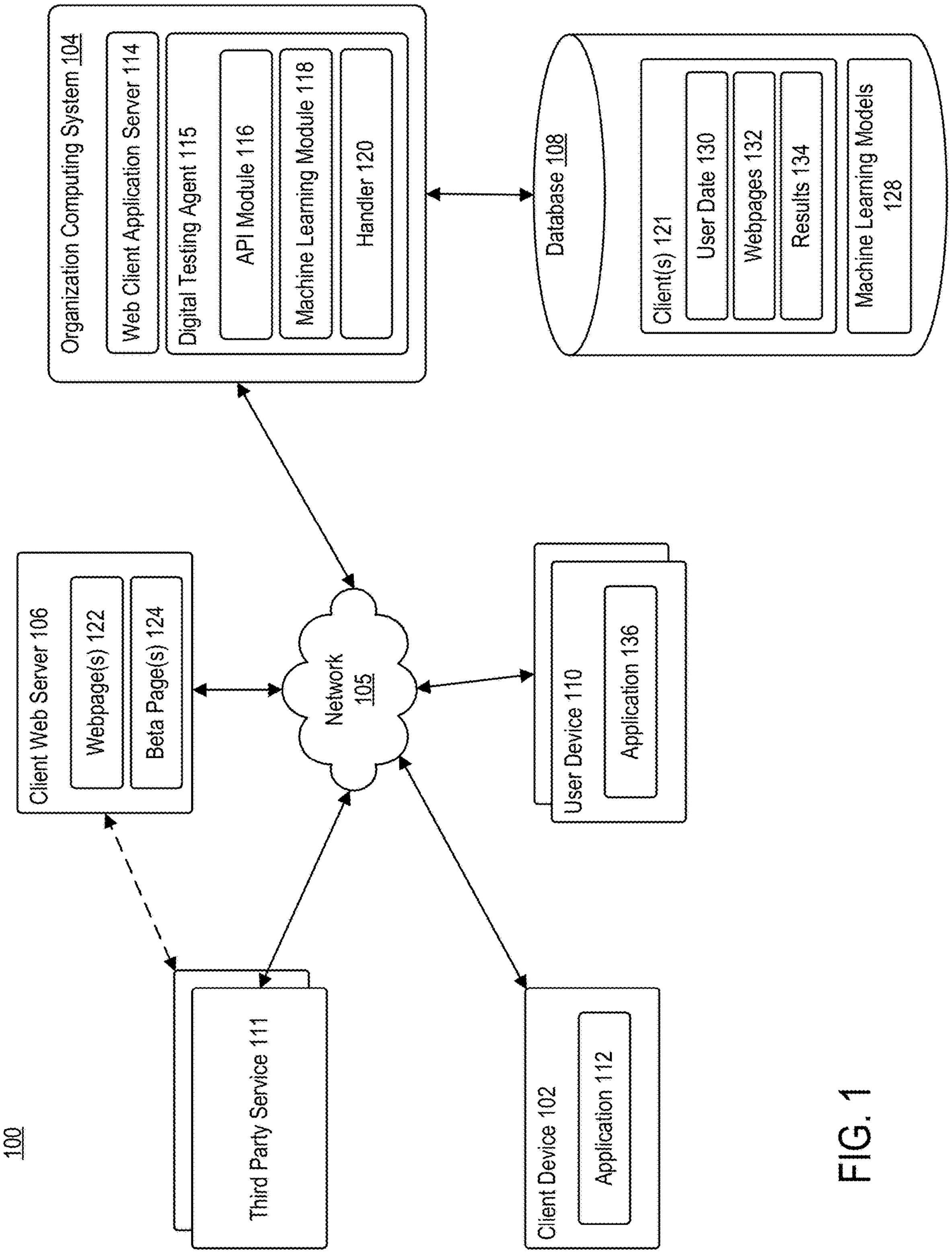
FIG. 1 is a block diagram illustrating a computing environment, according to example embodiments.

FIG. 1 is a block diagram illustrating a computing environment 100, according to one embodiment. Computing environment 100 may include at least a client device 102, organization computing system 104, client web server 106, database 108, user device 110, and third party service 111 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 112. Application 112 may be representative of a web browser that allows access to a website or a stand-alone application. Client device 102 may access application 112 to access functionality of organization computing system 104. Client device 102 may communicate over network 105 to request a webpage, for example, from web client application server 114 of organization computing system 104. For example, client device 102 may be configured to execute application 112 to access content managed by web client application server 114. The content that is displayed to client device 102 may be transmitted from web client application server 114 to client device 102, and subsequently processed by application 112 for display through a graphical user interface (GUI) of client device 102.

Client web server 106 may be associated with an organization or entity associated with client device 102. For example, client web server 106 may host one or more webpages 122 that are associated with the organization or entity associated with client device 102. In operation, when a user requests a web page associated with the entity associated with client web server 106, the user's device may send a hypertext transfer protocol (HTTP) to client web server 106 to receive a webpage 132 associated therewith. As illustrated, in addition to webpages 122, client web server 106 may further include beta pages 124. Beta pages 124 may include one or more variants of existing webpages 122, as well as one or more new webpages of a given website.

Client web server 106 may be in communication with third party service 111. Third party service 111 may be representative of a testing service for one or more webpages 122 associated with a given client. Third party service 111 may be configured to manage one or more webpages 122 and one or more beta pages 124, associated with each of the one or more webpages 122. In some embodiments, third party service 111 may be configured to intercept hypertext transfer protocol (HTTP) requests transmitted from user device 110 to client web server 106. For example, upon intercepting the HTTP request, third party service 111 may determine which variant (e.g., beta page 124) of the requested webpage 132 to transmit to user device 110 for testing purposes. In some embodiments, third party service 111 may be configured to receive a notification from client web server 106 that a user device 110 requested a webpage 132. Third party service 111 may determine whether the transmit the requested webpage 132 to user device 110 or to transmit a variant (i.e., beta page 124) of webpage 132 to user device 110 for testing purposes.

User device 110 may be operated by a user. For example, user device 110 may be a mobile device, a tablet, a desktop computer, or any computing system having the capabilities described herein. User device 110 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with client web server 106.

User device 110 may include at least application 136. Application 136 may be representative of a web browser that allows access to a website or a stand-alone application. User device 110 may access application 136 to access one or more webpages 122 (or beta pages 124) hosted by client web server 106. Client device 102 may communicate over network 105 to request a webpage, for example, from client web server 106. For example, user device 110 may be configured to execute application 136 to access content managed by client web server 106. In some embodiments, the content served to client web server 106 may be determined by third party service 111. For example, an HTTP request sent from user device 110 to client web server 106 may be intercepted by third party service 111. Third party service 111 may determine whether to serve user device 110 an established webpage 132 or a beta page 124 (i.e., a beta version of the requested webpage). The content that is displayed to user device 110 may be transmitted from client web server 106 to user device 110, and subsequently processed by application 136 for display through a graphical user interface (GUI) of user device 110.

Organization computing system 104 may include at least web client application server 114 and digital testing agent 115. Digital testing agent 115 may be configured to digitally test products provided by a client (e.g., client device 102). For example, digital testing agent 115 may be configured to test variants of a given webpage, to determine if features added and/or removed from the particular webpage are beneficial or harmful to the client. In other words, digital testing agent 115 may test digital products using a certain population, such that a client may be provided with statistics that allow the client to determine whether or not to roll out an update or a variant of a particular webpage, application, etc. For example, digital testing agent 115 may be configured to generate causal performance estimates based on an analysis of a webpage or website associated with a client. Digital testing agent 115 may be configured to generate a set of rules, based on the analysis, to adaptively design experiments based on the causal performance estimates. Such causal performance estimates help provide an improvement over conventional digital testing platforms that utilize Bayesian bandits in their analysis. Digital testing agent 115 may provide meta-learning functionality across pages (e.g., whole-site optimization) by using results learned from experimentation on one page to inform allocation behavior on other pages; identifying missing site content and recommending entirely new pages or modules within an existing page.

Digital testing agent 115 may include application programming interface (API) module 116, machine learning module 118, and handler 120. Each of API module 116, machine learning module 118, and handler 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

API module 116 may include one or more instructions to execute one or more APIs that provide various functionalities related to the operations of organization computing system 104. In some embodiments, API module 116 may include an API adapter that allows API module 116 to interface with and utilize enterprise APIs maintained by organization computing system 104 and/or an associated entity that may be homed on other systems or devices. In some embodiments, APIs may enable organization computing system 104 to communicate with one or more of client device 102 and/or client web server 106. For example, organization computing system 104 may be configured to retrieve one or more sets of data from one or more endpoints defined at one or more webpages 122 and/or beta pages 124 hosted by client web server 106. Exemplary data sets may include, for example, user data that includes indications of users interacting with variants of a given webpage. For example, the user data may include user conversion information for each beta page 124 of a particular webpage 132. In other words, the data received by API module 116 via various API endpoints may provide an indication to organization computing system 104 whether a user performed a desired action, as reflected in a key performance indicator (KPI). Exemplary desired actions or KPIs may include, but are not limited to, whether a user interacted with new elements, did not interact with new elements, made a purchase, did not make a purchase, stayed on the webpage for an extended period of time, quickly navigated away from the webpage, and the like.

Machine learning module 118 may be configured to analyze the various metrics received via API endpoints to generate results associated with each variant of a particular webpage. Such results may include metric that quantify risks and benefits associated with each variant of the webpage. Exemplary results may illustrate that a certain variant is underperforming in relation to the other variants. In another example, the results may illustrate that a certain variant is overperforming in relation to other variants. Performance may be based on whether a user performed a conversion action. Exemplary conversion actions may include, but are not limited to, a user interacted with new elements, did not interact with new elements, made a purchase, did not make a purchase, stayed on the webpage for an extended period of time, quickly navigated away from the webpage, and the like.

Machine learning module 118 may include a set of robustness features, such as those described below, that include, but are not limited to, dynamic, automated model corrections based on one or more of statistical monitoring, experimenter-specified data deletion, down-weighting, and the like, and inclusion of macroeconomic variables in models to account for known and unknown externalities.

Machine learning module 118 may include one or more instructions to train a prediction model. Generally, machine learning module 118 may train the prediction model to include a broad set of additional capabilities to take advantage of structured learning about variants and users across the entire site optimization program to increase power and offer a unique set of additional program-level capabilities that improve user response rates. In some embodiments, to train the prediction model, machine learning module 118 may implement a reinforcement learning training process. For example, machine learning model may use a Bayesian reinforcement learning approach (e.g., perpetual bandits) that mitigates the gaps in conventional testing frameworks. By taking a perpetual bandit approach, digital testing agent 115 may be configured to continuously allocate volume to higher performing variants to achieve a consistent lift. In other words, by using a perpetual bandit approach, the client is able to pause the digital testing, analyze the results, and re-allocate volume (e.g., network traffic) to those webpage variants that are performing better than other webpage variants. In some embodiments, digital testing agent 115 may alert the user based on an analysis of the web page activity.

In some embodiments, machine learning module 118 may be able to support dynamic updating of digital testing programs based on streams of user activity. Based on streams of user activity, machine learning module 118 may automatically inject extra explorations into the digital testing based on issues uncovered during the analysis. For example, if machine learning module 118 identifies model confidence or under-exploitation (e.g., sudden, unexplained response rates change), machine learning module 118 may adjust the analysis by injecting extra explorations into the digital testing.

Machine learning module 118 may be representative of a Bayesian bandit model. Use of the Bayesian bandit model may allow for one or more of sample size estimation, traffic forecasting, and the like, for program planning forecasting what resources are available to experiment with (samples/visitors) and which experiments to prioritize. In some embodiments, the Bayesian bandit model may be composed of several sub-models. For example, Bayesian bandit model may be composed of at least a value model and a time dependent policy. The value model may estimate reward distributions based on a Bayesian regression model and one or more deterministic rules. The time dependent policy may be composed of a mixture of one or more bandit algorithms and one or more deterministic rules. The time dependent policy may map reward distributions to a real-time allocation of visitors to experiences or variants of the web page or website.

In some embodiments, machine learning module 118 may include a simulation sub-module configured to support simulations for evaluation of value models and counterfactual evaluation of policies that can be utilized to estimate performance of variants that have never been tested or estimate the improvement achievable by incorporating some new user data variables. In some embodiments, the same simulation sub-module may inform the program planning features.

In some embodiments, machine learning module 118 may further include an attribution model. The attribution model may be based on Bayesian multi-touch attribution that may feed into the value model. In some embodiments, machine learning module 118 may utilize two Bayesian multi-touch attribution models that may be employed at two levels: a first multi-touch attribution model to account for the effect of marketing in other channels (e.g., search engine marketing (SEM), Facebook, and the like); and a second multi-touch attribution model to determine the contribution of each page to the website. Unlike more general reinforcement learning algorithms, there is nothing connecting actions taken on various webpages in various channels to the ultimate value-providing action, e.g., product purchase, application, etc. The efficacy of machine learning module 118 may include the bandit's localized picture of reward be information by a more global picture, which the first and second multi-touch attribution models provide.

Accordingly, machine learning module 118 may combine Bayesian multi-touch attribution at two levels to ensure the localized optimization/experimentation on each page leads to improved outcomes on the overall site and in the overall marketing funnel, and to optimize metric selection.

Machine learning module 118 may further include one or more econometric algorithms configured to monitor execution and performance of a webpage. For example, machine learning module 118 may be configured to perform a multivariate analysis of factorized treatments, thus allowing for new experience recommendations and/or dynamic reconstruction of experiences given an appropriate user-provided or learned taxonomy. In this manner, digital testing agent 115 may allow for swappable fragments of a webpage or website that can be interchanged flexibly but within safe user-defined constraints (e.g., no blue text on blue background). Such flexibility may allow for always-on or perpetual experiments. In this manner, machine learning module 118 may be trained to optimize causal insights for the client.

In some embodiments, machine learning module 118 may be highly customizable to end users. In some embodiments, machine learning module 118 may be configured to support various client interventions. For example, machine learning module 118 may allow clients to force static allocation of webpages for certain experiments (e.g., anticipating a change point). In another example, machine learning module 118 may allow clients to delete data that's known to be corrupted (e.g., due to faulty system integrations). In another example, machine learning module 118 may allow clients to inject prior assumptions or subjective beliefs of the experimenters to inform estimates of rewards, thereby influencing the allocation policy for webpages. Such interventions or customizations may be made to be applied broadly across the entire website or locally in a single experiment. Further, in some embodiments, such interventions or customization can be reversed, if, for example, the data is corrected.

In some embodiments, machine learning module 118 may further include a recommendation sub-module. Recommendation sub-module may be configured to analyze the user to generate data recommendation of metrics from a metric library or new metrics defined dynamically from data mining available outcome variables for specific pages/experiments. In some embodiments, the recommendation is informed by the multi-touch attribution models and ongoing monitoring of correlation between faster-feedback engagement variables, such as, but not limited to, one or more of clickthrough, dwell time, and funnel descent and slower but more meaningful performance variables like customer conversion, initial value of purchases, or long-term customer value projections. Such functionality may support the client or experimenter in selecting the metric that makes the best tradeoff between feedback time (e.g., faster means more dynamic, responsive learning) and alignment to true business value (e.g., high correlation with realized customer value).

In some embodiments, machine learning module 118 may personalize experiences for each user by employing a variety of user data from cookies, additional first-party attributes for existing customers and for prospects that can be identified based on machine fingerprinting and/or digital management platform (DMP) identity matching, as well as third-party data from DMPs. Machine learning module 118 may further account for exogenous confounders to improve sample-efficiency of experiments and generalizability of insights. For example, machine learning module 118 may include macroeconomic indicators when optimizing for KPIs involving a financial outlay from users, such as product purchases.

Handler 120 may be configured to maintain database 108. Database 108 may include clients 121 and machine learning models 128. Clients 121 may be representative of one or more entities associated with each client device 102. For example, each client 121 may be associated with an entity for which dynamic testing will be performed. Each client 121 may include user data 130, webpages 132, and results 134. User data 130 may be associated with metrics associated with a given user's interaction with webpages 132 and/or beta pages 124. User data 130 may include, for example, a set of KPIs for which to optimize for and/or indications as to whether the user "converted" when accessing each webpage 132 and/or beta page 124. Converting may refer to whether a user achieved a client-defined goal. Exemplary client-defined goals may include, but are not limited to, whether the user opened a new line of credit, whether the user submitted an application, whether the user interacted with a particular item on the webpage, and the like. In some embodiments, user data 130 may further include one or more sets of information provided by a given user. For example, when a use submits a credit card application, user data 130 may include information, such as, but not limited to, name, age, address, sex, credit score, income, employment, and the like.

Webpages 132 may correspond to one or more webpages 122 associated with a particular client. Webpages 132 may be representative as default webpages (e.g., business-as-usual webpages that are transmitted and displayed to users) and beta pages (e.g., variants of default webpages). Results 134 may correspond to a metrics associated with each webpage 132. Such results 134 may be representative of the number of conversions for each respective webpage 132.

Machine learning models 128 may correspond to one or more trained prediction models that may be applied to results 134. For example, when digital testing agent 115 analyzes the results of the dynamic testing, digital testing agent 115 may attempt to fit one or more machine learning models 128 to the data (e.g., results 134).

In some embodiments, to set up a data testing experiment or program, client device 102 may access a portal or dashboard for defining various metrics associated with the data testing experiment or program. For example, via a portal or dashboard, a user may generate dynamic definitions and selections of optimization metrics. In some embodiments, via the portal or dashboard, the user may define risk/budget constraints. Such generation and definition may result in utilization of an appropriate model dynamically specified from an extendable library of Bayesian models, bandit algorithms, and business rules that can be incorporated therein. In this manner, digital testing agent 115 may support a variety of experimenter interactions not offered by conventional systems, such as, but not limited to, prior specification, flexible inclusion of business rules in models, and incorporation of risk/budget constraints.

Figure 2:
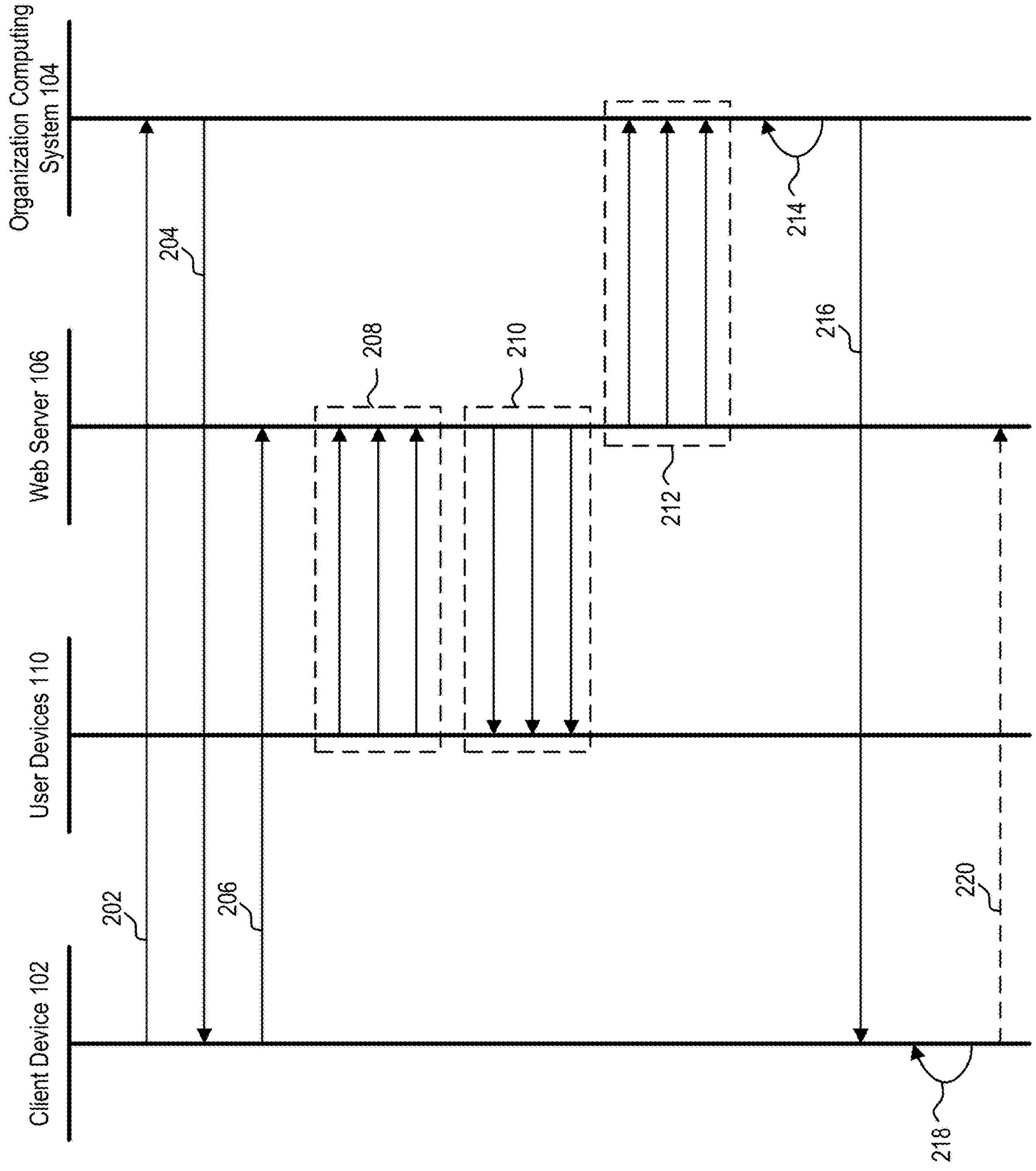
FIG. 2 is a block diagram illustrating one or more operations associated with digital testing of a webpage, according to example embodiments.

FIG. 2 is a block diagram 200 illustrating communications among components of computing environment 100, according to example embodiments.

At step 202, client device 102 may transmit a request to organization computing system 104 to access functionality of digital testing agent 115. For example, client device 102 may transmit the request via application 112 executing thereon. Digital testing agent 115 may be used for digitally testing a website associated with client device 102. In some embodiments, digital testing agent 115 may aid in advising client device 102 how to structure the digital test. In some embodiments, the request may include one or more constraints for digital testing of the webpage. For example, At step 204, organization computing system 104 may receive the request from client device 102. Organization computing system 104 may grant client device 102 access to functionality of digital testing agent 115. For example, organization computing system 104 may provide access to functionality of digital testing agent 115 as a service (e.g., modeling-as-a-service).

At step 206, client device 102 may upload one or more beta pages on web server 106. In other words, client device 102 may upload one or more webpage variants to web server 106 for digital testing. In some embodiments, client device 102 may define one or more API endpoints at each webpage and/or beta page hosted on web server 106. Each API endpoint may be used to transmit user information from each webpage and/or beta page directly to organization computing system 104 for analysis.

At step 208, user devices 110 may request a webpage from client web server 106. For example, client web server 106 may receive a plurality of HTTP requests from a plurality of user devices 110, each user device 110 requesting a webpage hosted by client web server 106.

At step 210, web server 106 may serve the requested webpage to each respective user device 110. In some embodiments, web server 106 may serve a user device 110 the default requested webpage (i.e., the business-as-usual webpage). In some embodiments, web server 106 may serve a user device 110 a variant of the requested webpage.

In some embodiments, client web server 106 may interface with third party service 111. For example, third party service 111 may intercept HTTP requests transmitted from user device 110 to client web server 106. In another example, third party service 111 may receive a notification from client web server 106 that a user device 110 transmitted an HTTP request for a webpage for which one or more beta pages exist. Third party service 111 may assign a variant of the requested webpage to user device 110.

In some embodiments, client web server 106 may interface with organization computing system 104. For example, third party service 111 may intercept HTTP requests transmitted from user device 110 to client web server 106. In another example, organization computing system 104 may receive a notification from client web server 106 that a user device 110 transmitted an HTTP request for a webpage for which one or more beta pages exist. Organization computing system 104 may assign a variant of the requested webpage to user device 110.

At step 210, client web server 106 may serve each user device 110 with a respectively assigned webpage. In some embodiments, client web server 106 may serve user device 110 a business-as-usual webpage. In some embodiments, client web server 106 may serve user device 110 a variant of the requested webpage (i.e., a beta page).

At step 212, client web server 106 may transmit user data to organization computing system 104. For example, client web server 106 may transmit user data to organization computing system 104 via one or more API endpoints. User data may include, but is not limited to: the variant of the webpage served to user device 110, whether user device 110 converted, a device type associated with user device 110, a fingerprint associated with user device 110, any personal identification information submitted by user device 110 (e.g., name, address, credit score, income, etc.), and the like.

At step 214, organization computing system 104 may input the user data into a trained machine learning model. For example, digital testing agent 115 may input the user data into one or more trained machine learning models. In some embodiments, the machine learning models implement Bayesian multi-arm bandit algorithms. By inputting the user data into one or more trained machine learning models, digital testing agent 115 may dynamically fit the machine learning model to the user data. The output, from the machine learning models, may be one or more results that quantify the risks and benefit associated with each variant webpage. For example, digital testing agent 115 may determine that a first variant of a given webpage is performing better than a second variant of the same webpage. In such situation, digital testing agent 115 may recommend that client cease operation of the second variant. Alternatively, digital testing agent 115 may recommend that client device 102 direct user traffic to one or more endpoints associated with another variant.

In some embodiments, such as when a client is attempting to test a webpage with multiple variables, digital testing agent 115 may utilize the machine learning models to identify those variables that are underperforming relative to the other variables on the webpage. For example, upon determining that a given variable of a variant webpage is underperforming, digital testing agent 115 may recommend that client device 102 stop testing the variable.

At step 216, organization computing system 104 may create a portal accessible to client device 102. The portal may include the one or more results and/or recommendations generated by digital testing agent 115. The results and/or recommendations may quantify the risks and benefits associated with each of the one or more variants of the webpages. Organization computing system 104 may notify client device 102 that the portal is available.

At step 218, client device 102 may access the portal generated by organization computing system 104 to view the one or more results and/or recommendations generated by client device 102. At step 220, client device 102 may modify the webpages hosted on client web server 106. For example, based on the results and/or recommendations generated by digital testing agent 115, client device 102 may modify client web server 106 to replace a webpage with a specific variant that performed well.

Figure 3:
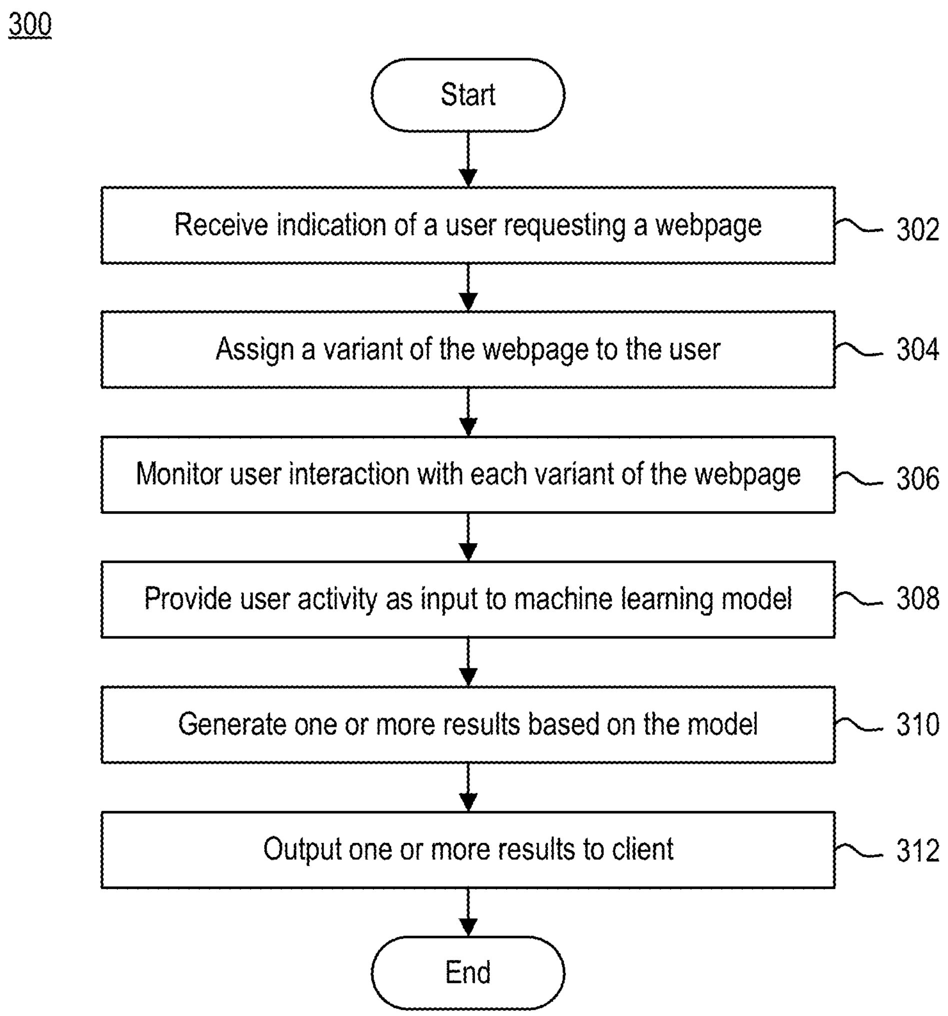
FIG. 3 is a flow diagram illustrating a method of digitally testing a webpage, according to example embodiments.

FIG. 3 is a flow diagram illustrating a method 300 of digitally testing a webpage, according to example embodiments. Method 300 may begin at step 302.

At step 302, organization computing system 104 may receive an indication of a user attempting to access a webpage hosted by client web server 106. In some embodiments, organization computing system 104 may intercept the HTTP request transmitted by a user device 110. In some embodiments, organization computing system 104 may receive a notification from client web server 106 that a user device 110 is attempting to access a webpage for which one or more beta pages (e.g., variants) exist. In some embodiments, organization computing system 104 may be notified via one or more API endpoints defined at client web server 106.

At step 304, organization computing system 104 may assign a variant of the requested webpage to user device 110. For example, if a user device 110 requests a given webpage for which one or more variants exist, organization computing system 104 may instruct client web server 106 to serve user device 110 with the default, business-as-usual web page or one or more variants thereof. Each variant web page may include one or more variables for which organization computing system 104 and client device 102 are testing. For example, each variant web page may include at least one conversion item, wherein interaction with the conversion item may correspond to the user converting on the webpage. An exemplary conversion item may be a submit button on a credit card application.

At step 306, organization computing system 104 may monitor user interaction with each variant of the webpage. For example, digital testing agent 115 may continuously or intermittently receives user data via one or more API endpoints. In some embodiments, digital testing agent 115 may receive the user data via one or more API endpoints. In some embodiments, digital testing agent 115 may poll the one or more API endpoints to request the user data.

At step 308, organization computing system 104 may provide user activity data as input to one or more machine learning models. For example, digital testing agent 115 may input the user data into one or more trained machine learning models. In some embodiments, the machine learning models implement Bayesian multi-arm bandit algorithms.

At step 310, organization computing system 104 may generate one or more results and/or recommendations using the machine learning models. For example, by inputting the user data into one or more trained machine learning models, digital testing agent 115 may dynamically fit the machine learning model to the user data. The output, from the machine learning models, may be one or more results that quantify the risks and benefit associated with each variant webpage. For example, digital testing agent 115 may determine that a first variant of a given webpage is performing better than a second variant of the same webpage. In such situation, digital testing agent 115 may recommend that client cease operation of the second variant. Alternatively, digital testing agent 115 may recommend that client device 102 direct user traffic to one or more endpoints associated with another variant. Generally, the results and/or recommendations may quantify the risks and benefits associated with each of the one or more variants of the webpages.

At step 312, organization computing system 104 may output the one or more results and/or recommendations to client device 102. For example, organization computing system 104 may create a portal accessible to client device 102. The portal may include the one or more results and/or recommendations generated by digital testing agent 115. Organization computing system 104 may notify client device 102 that the portal is available.

Figure 4:
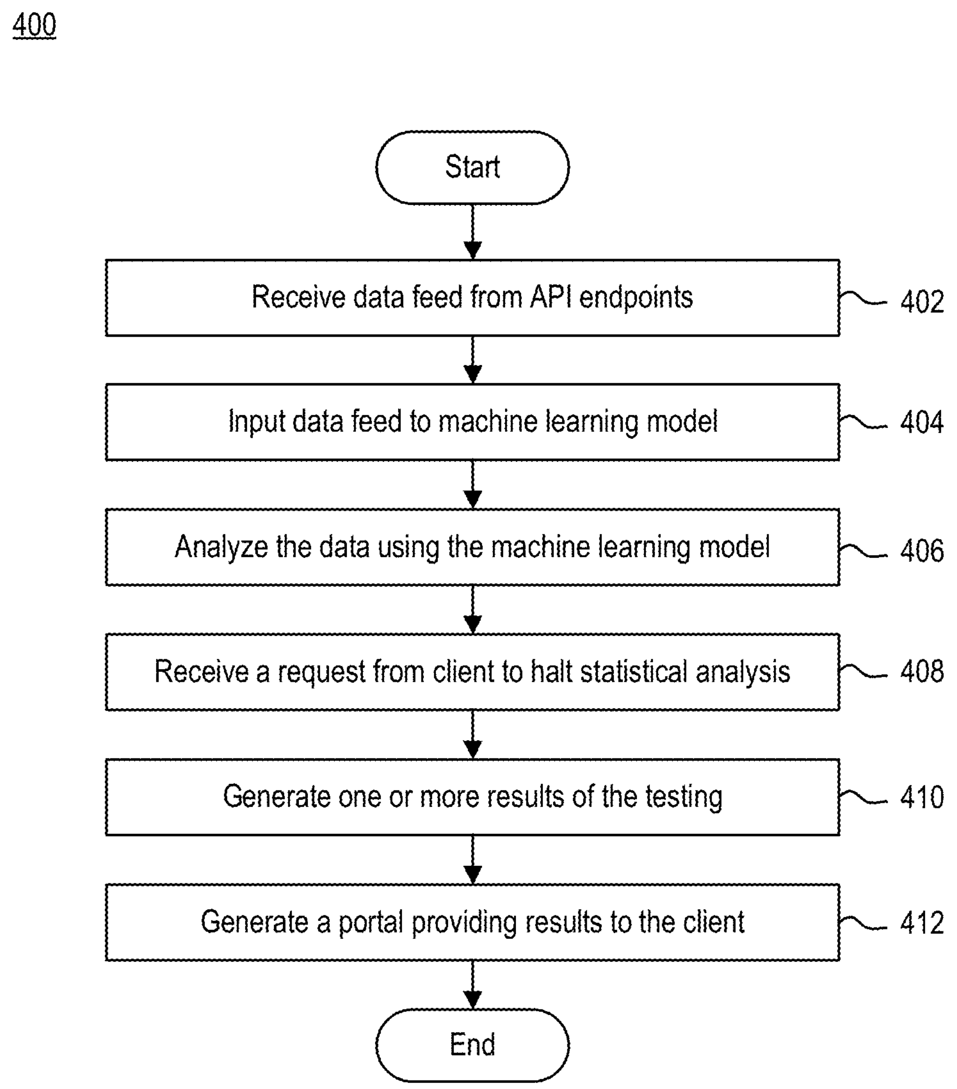
FIG. 4 is a flow diagram illustrating a method of digitally testing a webpage, according to example embodiments.

FIG. 4 is a flow diagram illustrating a method 400 of digitally testing a webpage, according to example embodiments. Method 400 may begin at step 402.

At step 402, organization computing system 104 may receive one or more user data feeds from one or more API endpoints. Generally, organization computing system 104 may monitor user interaction with each variant of the webpage. For example, digital testing agent 115 may continuously or intermittently receives user data via one or more API endpoints. In some embodiments, digital testing agent 115 may receive the user data via one or more API endpoints. In some embodiments, digital testing agent 115 may poll the one or more API endpoints to request the user data.

At step 404, organization computing system 104 may provide user activity data as input to one or more machine learning models. For example, digital testing agent 115 may input the user data into one or more trained machine learning models. In some embodiments, the machine learning models implement Bayesian multi-arm bandit algorithms.

At step 406, organization computing system 104 may analyze the user data using the machine learning models. For example, by inputting the user data into one or more trained machine learning models, digital testing agent 115 may dynamically fit the machine learning model to the user data.

At step 408, organization computing system 104 may receive a request from client device 102 to halt digitally testing the webpage. In conventional approaches to digital testing, pausing or halting a digital test was simply not possible. This is due, for example, to the types of machine learning algorithms historically used for digital testing. Through the use of Bayesian multi-arm bandit algorithms, clients may stop, halt, or pause digital testing of the website at any point, without disrupting the results and/or recommendations to be generated.

At step 410, organization computing system 104 may generate one or more results of the testing. For example, digital testing agent 115 may receive, as output from the machine learning models, may be one or more results that quantify the risks and benefits associated with each variant webpage. For example, digital testing agent 115 may determine that a first variant of a given webpage is performing better than a second variant of the same webpage. In such situation, digital testing agent 115 may recommend that client cease operation of the second variant. Alternatively, digital testing agent 115 may recommend that client device 102 direct user traffic to one or more endpoints associated with another variant. Generally, the results and/or recommendations may quantify the risks and benefits associated with each of the one or more variants of the webpages.

At step 412, organization computing system 104 may create a portal accessible to client device 102. The portal may include the one or more results and/or recommendations generated by digital testing agent 115. Organization computing system 104 may notify client device 102 that the portal is available.

Figure 5:
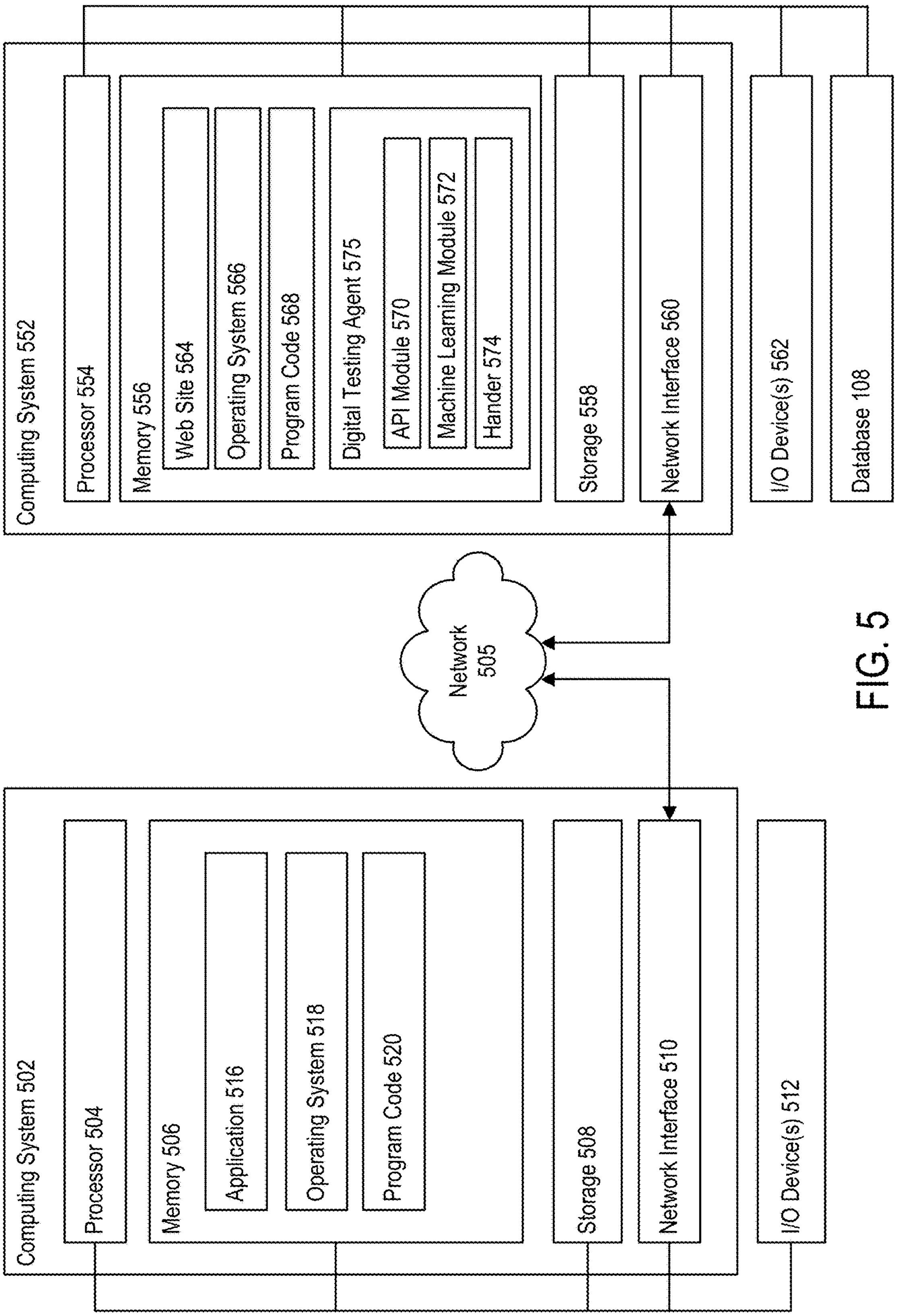
FIG. 5 is a block diagram illustrating a computing environment, according to example embodiments.

FIG. 5 is a block diagram illustrating an exemplary computing environment 500, according to some embodiments. Computing environment 500 includes computing system 502 and computing system 552. Computing system 502 may be representative of client device 102. Computing system 552 may be representative of organization computing system 104.

Computing system 502 may include a processor 504, a memory 506, a storage 508, and a network interface 510. In some embodiments, computing system 502 may be coupled to one or more I/O device(s) 512 (e.g., keyboard, mouse, etc.).

Processor 504 may retrieve and execute program code 520 (i.e., programming instructions) stored in memory 506, as well as stores and retrieves application data. Processor 504 may be included to be representative of a single processor, multiple processors, a single processor having multiple processing cores, and the like. Network interface 510 may be any type of network communications allowing computing system 502 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 516, operating system 518, and program code 520. Program code 520 may be accessed by processor 504 for processing (i.e., executing program instructions). Program code 520 may include, for example, executable instructions for communicating with computing system 552 to display one or more pages of website 564. Application 516 may enable a user of computing system 502 to access a functionality of computing system 552. For example, application 516 may access content managed by computing system 552, such as website 564. The content that is displayed to a user of computing system 502 may be transmitted from computing system 552 to computing system 502, and subsequently processed by application 516 for display through a graphical user interface (GUI) of computing system 502.

Computing system 552 may include a processor 554, a memory 556, a storage 558, and a network interface 560. In some embodiments, computing system 552 may be coupled to one or more I/O device(s) 562. In some embodiments, computing system 552 may be in communication with database 108.

Processor 554 may retrieve and execute program code 568 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include website 564, operating system 566, program code 568, and digital testing agent 575. Program code 568 may be accessed by processor 554 for processing (i.e., executing program instructions). Program code 568 may include, for example, executable instructions configured to perform steps discussed above in conjunction with FIGS. 2-4. As an example, processor 554 may access program code 568 to perform operations related to digitally testing a website. Website 564 may be accessed by computing system 502. For example, website 564 may include content accessed by computing system 502 via a web browser or application.

Digital testing agent 575 may be configured to digitally test products provided by a client (e.g., computing system 502). For example, digital testing agent 575 may be configured to test variants of a given webpage, to determine if features added and/or removed from the particular webpage is beneficial or harmful to the client. In other words, digital testing agent 575 may test digital products using a certain population, such that a client may be provided with statistics that allow the client to determine whether or not to roll out an update or a variant of a particular webpage, application, etc.

Digital testing agent 575 may include (API) module 570, machine learning module 572, and handler 574.

API module 570 may include one or more instructions to execute one or more APIs that provide various functionalities related to the operations of organization computing system 104. In some embodiments, API module 570 may include an API adapter that allows API module 570 to interface with and utilize enterprise APIs maintained by computing system 552 and/or an associated entity that may be homed on other systems or devices. In some embodiments, APIs may enable computing system 552 to communicate with one or more of computing system 502 and/or client web server. For example, computing system 552 may be configured to retrieve one or more sets of data from one or more endpoints defined at one or more webpages and/or beta pages hosted by client web server 106. Exemplary data sets may include, for example, user data that includes indications of users interacting with variants of a given webpage. For example, the user data may include user conversion information for each beta page of a particular webpage. In other words, the data received by API module 570 via various API endpoints may provide an indication to computing system 552 whether a user interacted with new elements, did not interact with new elements, made a purchase, did not make a purchase, stayed on the webpage for an extended period of time, quickly navigated away from the webpage, and the like.

Machine learning module 572 may be configured to analyze the various metrics received via API endpoints to generate results associated with each variant of a particular webpage. Such results may include metric that quantify risks and benefits associated with each variant of the webpage. Exemplary results may illustrate that a certain variant is underperforming in relation to the other variants. In another example, the results may illustrate that a certain variant is overperforming in relation to other variants. Performance may be based on whether a user performed a conversion action. Exemplary conversion actions may include, but are not limited to, a user interacted with new elements, did not interact with new elements, made a purchase, did not make a purchase, stayed on the webpage for an extended period of time, quickly navigated away from the webpage, and the like.

Machine learning module 572 may include one or more instructions to train a prediction model. In some embodiments, to train the prediction model, machine learning module 572 may implement a reinforcement learning training process. For example, machine learning model may use a Bayesian reinforcement learning approach (e.g., perpetual bandits) that mitigates the gaps in conventional testing frameworks. By taking a perpetual bandit approach, digital testing agent 575 may be configured to continuously allocate volume to higher performing variants to achieve a consistent lift. Handler 574 may be configured to maintain database 108.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A system, comprising:
memory; and
one or more processors, coupled to memory, configured to cause the system to:
receive, from a client device, a request to access functionality of a digital testing agent to test a website associated with the client device;
grant the client device the access to the functionality of the digital testing agent before the client device uploads variants, associated with the website, to a web server for digital testing;
receive, from the web server and via one or more application programming interface (API) endpoints, data that indicates:
a variant, of the variants, served to a user device, and one or more of:
whether the user device converted,
a device type associated with the user device, or interactions with the variant via the user device;
identify, based on the data, that the variant is overperforming in relation to one or more other variants of the variants;
adjust, based on the variant overperforming in relation to the one or more other variants, the digital testing by continuously allocating volume to higher performing variants of the variants, wherein the higher performing variants include the variant;
adjust, based on a response rate change associated with the variants, the digital testing by injecting extra explorations into the digital testing;
receive, from the client device, a request to halt testing of a webpage of the website; and
halt testing of the website without disrupting one or more results or recommendations from the testing of the website.

2. The system of claim 1,
wherein the data indicates that the user device converted, and
wherein, to identify that the variant is overperforming in relation to the one or more other variants, the one or more processors cause the system to:
identify, based on the variant being served to the user device and based on data indicating that the user device converted, that the variant is overperforming in relation to the one or more other variants.

3. The system of claim 1,
wherein the data indicates the device type associated with the user device, and
wherein, to identify that the variant is overperforming in relation to the one or more other variants, the one or more processors cause the system to:
identify, based on the variant being served to the user device and based on the device type associated with the user device, that the variant is overperforming in relation to the one or more other variants.

4. The system of claim 1,
wherein the data indicates the interactions with the variant via the user device, and
wherein, to identify that the variant is overperforming in relation to the one or more other variants, the one or more processors cause the system to:
identify, based on the variant being served to the user device and based on the interactions with the variant via the user device, that the variant is overperforming in relation to the one or more other variants.

5. The system of claim 1, wherein the one or more processors further cause the system to:
cause a pause to the digital testing before identifying that the variant is overperforming in relation to the one or more other variants.

6. The system of claim 1, wherein, to identify that the variant is overperforming in relation to the one or more other variants, the one or more processors cause the system to:
input the data into one or more machine learning models to generate one or more results of testing the website, and
identify, based on the one or more results, that the variant is overperforming in relation to the one or more other variants.

7. The system of claim 6, wherein the one or more results quantify one or more of risks or benefits associated with the variant.

8. The system of claim 1, wherein, to adjust the digital testing of the variants, the one or more processors further cause the system to:
determine to cease operation of a different variant of the one or more other variants based on the variant overperforming in relation to the one or more other variants.

9. A method, comprising:
receiving a request to test a website associated with a client device;
granting the request before the client device uploads variants, associated the website, to a web server;

receiving, from the web server and via one or more application programming interface (API) endpoints, data that indicates:

a variant, of the variants, served to a user device, and one or more of whether the user device converted, a device type associated with the user device, or interactions with the variant via the user device;

determining a response rate change in relation to one or more other variants of the variants;

adjusting, based on the response rate change in relation to the one or more other variants, testing of the variants by injecting extra explorations into the testing;

receiving a request to halt the testing; and halting the testing of the website without disrupting one or more results or recommendations from the testing.

10. The method of claim 9, further comprising:

determining to cease operation of a different variant of the variants based on the variant overperforming in relation to the different variant; and allocating network traffic to the variant based on ceasing the operation of the different variant.

11. The method of claim 9, further comprising:

directing network traffic to one or more endpoints associated with a different variant, of the one or more other variants, based on the different variant performing better than the variant.

12. The method of claim 9, further comprising:

determining that the variant is overperforming in relation to the one or more other variants.

13. The method of claim 12, further comprising:

allocating network traffic to the variant based on the variant overperforming in relation to the one or more other variants.

14. The method of claim 13, further comprising:

determining, after allocating the network traffic to the variant, that a different variant, of the variants, is performing better than the variant.

15. The method of claim 14, further comprising:

adjusting the testing of the variants another time after determining that the different variant is performing better than the variant.

16. The method of claim 15, wherein adjusting the testing of the variants another time comprises:

allocating new network traffic to the different variant based on determining that the different variant is performing better than the variant.

17. The method of claim 9, wherein the data indicates the interactions with the variant via the user device, and wherein the method further comprises:

identifying, based on the variant being served to the user device and based on the interactions with the variant via the user device, that the variant is overperforming in relation to the one or more other variants.

18. One or more non-transitory computer readable media storing instructions that, when executed by one or more processors, cause one or more operations comprising:

receiving, from a web server and via one or more application programming interface (API) endpoints, data that indicates:

a variant served to a user device, and one or more of whether the user device converted, a device type associated with the user device, or interactions with the variant via the user device;

determining, based on the data, that the variant is performing better than one or more other variants;

adjusting, based on determining that the variant is performing better in relation to the one or more other variants, testing by continuously allocating volume to one or more higher performing variants that include the variant;

receiving a request to halt the testing; and halting the testing without disrupting one or more results or recommendations from the testing.

19. The one or more non-transitory computer readable media of claim 18, wherein the one or more operations further comprise:

adjusting the testing another time by allocating network traffic to a different variant based on determining that the different variant is performing better than the variant.

20. The one or more non-transitory computer readable media of claim 18, wherein the one or more operations further comprise:

granting functionality of a digital testing agent to upload the variant for the testing.

* * * * *